United States Patent [19]

Russell

[11] Patent Number: 4,860,157

[45] Date of Patent: Aug. 22, 1989

[54] MOLDED CASE CIRCUIT BREAKER ACTUATOR-ACCESSORY MODULE

[75] Inventor: Ronald R. Russell, Plainville, Conn.

[73] Assignee: General Electric Company, New York, N.Y.

[21] Appl. No.: 185,723

[22] Filed: Apr. 25, 1988

[51] Int. Cl.[4] .............................................. H01H 47/00
[52] U.S. Cl. .................................... 361/156; 361/194
[58] Field of Search ............... 361/156, 155, 114, 115, 361/194; 335/13, 20, 179

[56] References Cited

U.S. PATENT DOCUMENTS

| | | | |
|---|---|---|---|
| 4,589,052 | 5/1986 | Dougherty | 361/94 |
| 4,622,444 | 11/1986 | Kandatsu et al. | 200/303 |
| 4,641,117 | 2/1987 | Willard | 335/7 |
| 4,652,975 | 3/1987 | Scott | 361/404 |
| 4,679,019 | 7/1987 | Todaro et al. | 335/172 |
| 4,700,161 | 10/1987 | Todaro et al. | 335/172 |
| 4,728,914 | 3/1988 | Morris et al. | 335/6 |

OTHER PUBLICATIONS

"Molded Case Circuit Breaker Shunt Trip Unit", Morris et al., Filed 12/16/87, Ser. No. 133,867.
"Molded Case Circuit Breaker Auxiliary Switch Unit", Yu et al., Filed 12/16/87, Ser. No. 133,868.
"Molded Case Circuit Breaker Multiple Accessory Unit", Russell et al., Filed 12/16/87, Ser. No. 133,869.
"Molded Case Circuit Breaker Actuator-Accessory Unit", Castonguay et al., Filed 3/3/88, Ser. No. 163,589.
"Molded Case Circuit Breaker Actuator-Accessory Module", Russell, Filed 4/1/88, Ser. No. 176,589.

Primary Examiner—L. T. Hix
Assistant Examiner—David M. Gray
Attorney, Agent, or Firm—Richard A. Menelly; Walter C. Bernkopf; Fred Jacob

[57] ABSTRACT

An integrated protection unit is a circuit breaker which includes basic overcurrent protection facility along with selective electrical accessories. A molded plastic accessory access cover secured to the integrated protection unit cover protects the accessory components contained within the integrated protection unit cover from the environment. A combined overcurrent trip actuator and multiple accessory module is either field-installed or factory-installed within the integrated protection unit. A separate actuator-accessory module is selected for different combinations of accessory functions. One such actuator-accessory module provides overcurrent protection along with remote trip facility.

12 Claims, 4 Drawing Sheets

MOLDED CASE CIRCUIT BREAKER ACTUATOR-ACCESSORY MODULE

BACKGROUND OF THE INVENTION

The trend in the circuit protection industry is currently toward complete circuit protection which is accomplished by the addition of supplemental protection apparatus to standard overcurrent protective devices, such as molded case circuit breakers. U.S. Pat. No. 4,622,444 entitled "Circuit Breaker Housing and Attachment Box" describes an accessory that can be field-installed within a circuit breaker without interfering with the integrity of the circuit breaker internal components. This is accomplished by mounting the accessories within a recess formed in the circuit breaker enclosure cover.

An electronic trip actuator which is mounted within the circuit breaker enclosure is described within U.S. Pat. No. 4,679,019 entitled "Trip Actuator for Molded Case Circuit Breakers". The circuit breaker actuator responds to trip signals generated by an electronic trip unit completely contained within a semi-conductor chip such as that described within U.S. Pat. No. 4,589,052. The development of a combined trip actuator for both overcurrent protection as well as accessory function is found within U.S. Pat. No. 4,700,161 entitled "Combined Trip Unit and Accessory Module for Electronic Trip Circuit Breakers". The aforementioned U.S. Patents which represent the advanced state of the art of circuit protection devices are incorporated herein for reference purposes.

A shunt trip accessory unit allows the circuit breaker operating mechanism to be articulated from a remote location to separate the circuit breaker contacts, usually to perform a tripping function for electrical system control and protection. One such shunt trip accessory unit is described within U.S. patent application Ser. No. 133,867 filed Dec. 16, 1987 entitled "Molded Case Circuit Breaker Shunt Trip Unit". An auxiliary switch accessory unit allows an operator to determine the "ON" or "OFF" conditions of a molded case circuit breaker contacts at a remote location by means of an audible alarm or visible display. One such auxiliary switch unit is described within U.S. patent application Ser. No. 133,868 filed Dec. 16, 1987 entitled "Molded Case Circuit Breaker Auxiliary Switch Unit". Both of the aforementioned U.S. Patent Applications are incorporated herein for purposes of reference.

A more recent example of a combined overcurrent trip actuator and multiple accessory unit is described within U.S. patent application Ser. No. 133,869 filed Dec. 16, 1987 entitled "Molded Case ing resistor connected Circuit Breaker Multiple Accessory Unit" which combined overcurrent trip actuator and multiple accessory Unit requires a separate mounting recess within the circuit breaker cover to house the printed wire board that carries the accessory control circuit. U.S. patent application Ser. No. 163,589 entitled "Molded Case Circuit Breaker Actuator-Accessory Unit" describes one such combined overcurrent trip actuator and multiple accessory unit wherein the printed wire board and actuator-accessory unit are both contained within the same mounting recess within the circuit breaker cover. U.S. patent application Ser. No. 176,589 describes an actuator-accessory module wherein the electromagnetic actuator and electronic control circuits are self-contained within a single unitary module. All of the aforementioned U.S. Patent Applications are incorporated herein for reference purposes.

SUMMARY OF THE INVENTION

An integrated protection module which includes overcurrent protection along with auxiliary accessory function within a common enclosure contains an accessory cover for access to the selected accessory modules, to allow field installation of the accessory modules within an integrated circuit protection unit. One combined actuator-accessory module provides overcurrent protection along with shunt trip function. The electromagnetic actuator includes a first coil for overcurrent operation and a second coil for shunt trip operation. The overcurrent electronic control is provided by the electronic trip circuit contained within the circuit breaker portion of the integrated protection unit whereas the shunt trip control is provided by an electronic circuit contained within the accessory module.

DESCRIPTION OF THE PREFERRED EMBODIMENT

Figure 1:
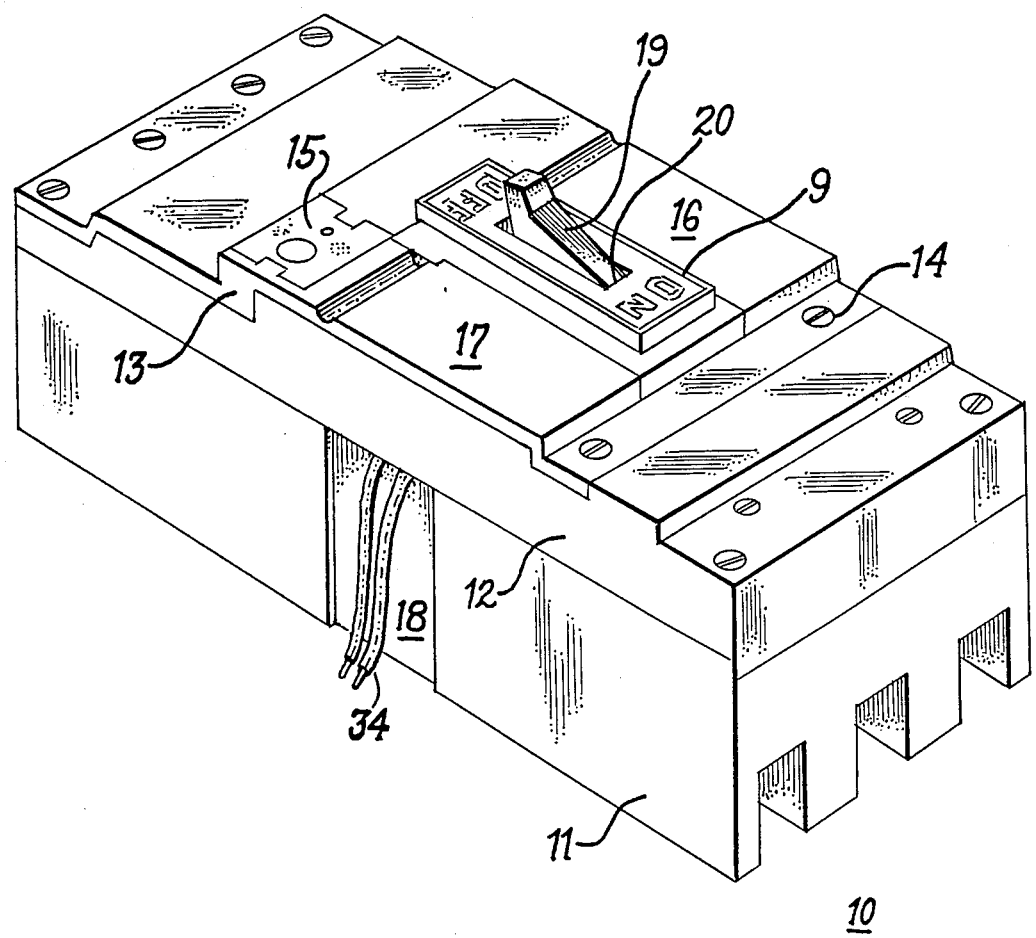
FIG. 1 is a top perspective view of an integrated molded case circuit breaker containing an overcurrent and shunt trip actuator accessory module according to the invention.
Figure 2:
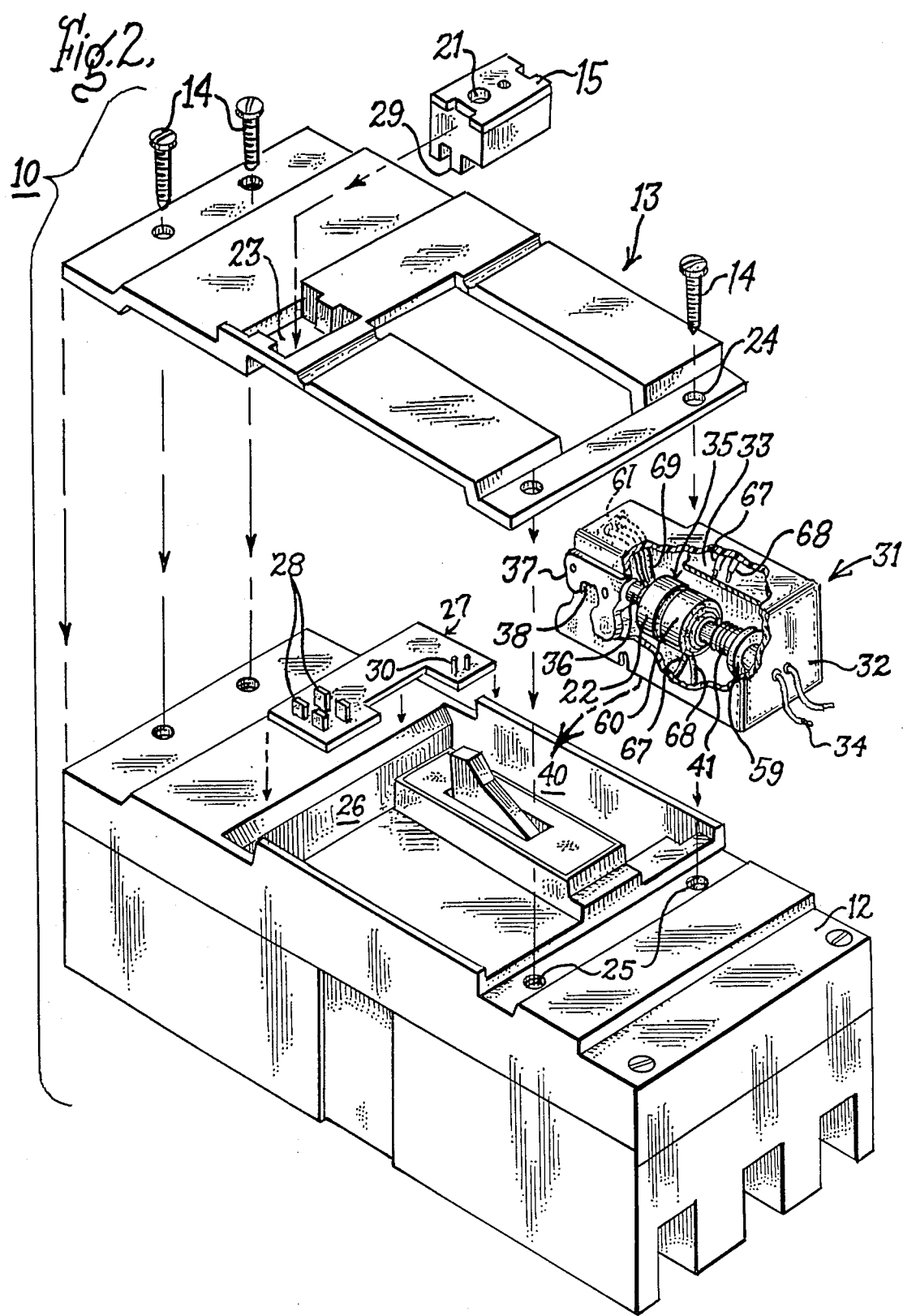
FIG. 2 is an exploded top perspective view of the integrated circuit breaker of FIG. 1 prior to assembly of the overcurrent and shunt trip actuator-accessory module according to the invention.

An integrated circuit breaker 10 consisting of a molded plastic case 11 with a molded plastic cover 12 is shown in FIG. 1 with the accessory cover 13 attached to the circuit breaker cover by means of screws 14. The case includes a wiring slot 18 formed therein for allowing external connection with a remote switch by means of conductors 34. The circuit breaker operating handle 19 extends up from an access slot 20 formed in the cover escutcheon 9. A rating plug 15 such as described in U.S. Pat. No. 4,728,914 entitled "Rating Plug Enclosure for Molded Case Circuit Breakers", which Patent is incorporated herein for reference purposes is shown assembled within the accessory cover. A pair of accessory doors 16, 17 are formed in the accessory cover for providing access to the overcurrent and shunt trip actuator and accessory module 31, hereafter "actuator-accessory module" contained within the recess 40, shown in FIG. 2. Still referring to FIG. 2, the rating plug 15 is fitted within a recess 23 formed in the accessory cover 13 and the accessory cover is fastened to the circuit breaker cover by means of screws 14, thru-holes 24 and threaded openings 25. Access to the rating plug interior for calibration purposes is made by means of the rating plug access hole 21.

The trip unit for the integrated circuit breaker 10 is contained within a printed wire board 27 which is positioned in the trip unit recess 26. The rating plug 15 when inserted within the rating plug recess interconnects with the printed wire board by means of pins 28 upstanding from the printed wire board and sockets 29 formed on the bottom of the rating plug. The trip unit in turn electrically connects with the current transformers 47, 48 (FIG. 3) by means described within U.S. Pat. No. 4,652,975 entitled "Mounting Arrangement for Circuit Breaker Current Sensing Transformers" which Patent is incorporated herein for reference purposes. When the trip unit printed wire board has been assembled within its recess, the actuator-accessory module 31 is then installed within recess 40. The actuator-accessory module includes a housing 32 within which the dual actuator-accessory coil 35 is enclosed and which further contains a plunger 36 and a plunger spring 41 which projects the plunger in a forward trip position when the dual actuator-accessory coil 35 becomes energized. The actuator-accessory module is similar to the actuator-accessory unit described within aforementioned U.S. Pat. Application Serial No. 163,589 wherein a trip actuator latch 37 is pivotally attached to the housing 32. A hook 38 formed at one end of the trip actuator latch cooperates with the circuit breaker operating mechanism shown in aforementioned U.S. Pat. No. 4,700,161 in the manner to be described below in greater detail. The operation of the actuator-accessory module is similar to that described within U.S. Pat. Nos. 4,641,117 and 4,679,019 which Patents are incorporated herein for purposes of reference. The dual actuator-accessory coil 35 differs from that described within some of the referenced Patents by including a separate flux shift coil 22 for overcurrent trip operation and a separate shunt trip coil 60 for remote shunt trip operation. A permanent magnet 59 is provided at the end of both coils to hold the plunger 36 against the bias exerted on the plunger by the charged plunger spring 41. A similar combined accessory and trip actuator unit is described within U.S. Pat. No. 4,641,117 entitled "Combined Accessory and Trip Actuator for Electronic Circuit Breaker" which Patent is incorporated herein for purposes of reference. The actuator-accessory module includes a printed wire board 33 which contains the components required for operating the shunt trip coil 60 and is connected with the shunt trip coil by means of a pair of wire conductors 67, 68. A pair of wire conductors 34 connect the actuator-accessory module with an external voltage source and switch for shunt trip operation. The flux shift coil 22 connects with the trip unit 27 by means of a pair of wire conductors 69 attached to the coil and by means of edge connectors 61 arranged within the housing for receiving a pair of pins 30 upstanding on the trip unit 27.

Figure 3:
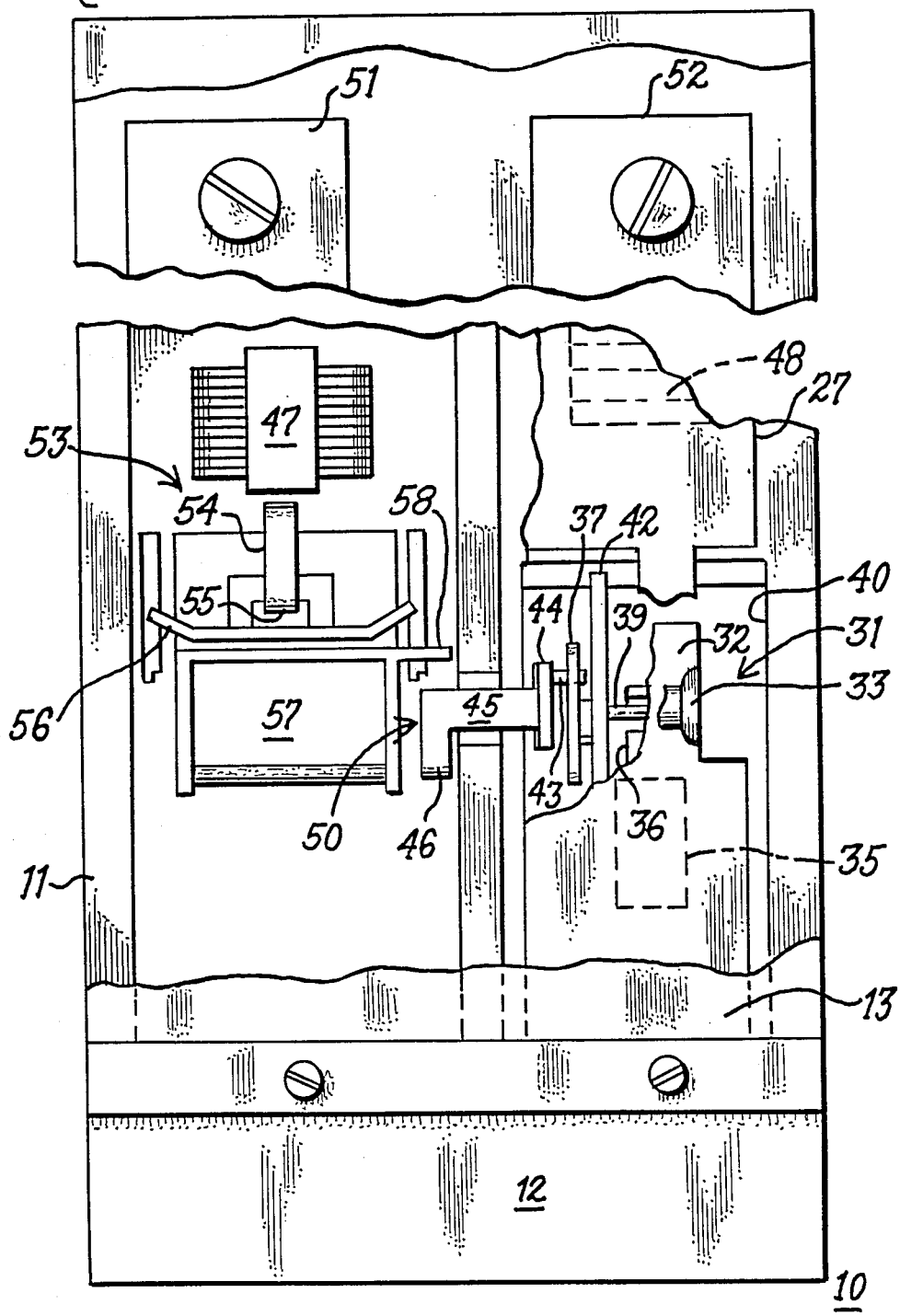
FIG. 3 is a plan view of the integrated molded case circuit breaker with part of the cover removed to show the interaction between the circuit breaker operating mechanism and the combined overcurrent and shunt trip actuator-accessory module of FIG. 2.

The actuator-accessory module 31 is depicted in FIG. 3 within the recess 40 in the integrated circuit breaker 10 with part of the actuator-accessory module printed wire board 33, actuator-accessory module housing 32 and accessory cover 13 removed to show the interaction between the actuator-accessory module 31 and the mechanical actuator 50 which sits in the integrated circuit breaker case 11. The integrated circuit breaker operating mechanism shown general at 53 includes an operating cradle 54 having a hook 55 formed at one end thereof which is retained by means of a primary latch 56. The secondary latch assembly 57 prevents the primary latch from releasing the operating cradle until the secondary latch is displaced. A tab 58 extending from the secondary latch is contacted by the operation of the mechanical actuator 50 to displace the secondary latch and thereby articulate the circuit breaker operating mechanism in response to a trip command in the following manner. Electric current flow is sensed by the current transformers 47, 48 which are located ahead of load lugs 51, 52 and is acted upon by the trip unit 27 described earlier with reference to FIG. 2. The operating lever 46 sits within the case 11 and connects with the latch support arm 44 in the actuator-accessory module recess 40 by means of a connecting arm 45. The latch pin 43 is retained by the trip actuator latch 37 which is in turn controlled by the position of the trip actuator arm 39 which extends through a side wall 42 of the actuator-accessory module housing 32. The trip actuator arm 39 interfaces with the plunger 36 in the following manner. When the circuit current exceeds a predetermined value, current is applied to the flux shift coil 22 thereby allowing the plunger 36 to be propelled by the urgence of the plunger spring (FIG. 2) to thereby rotate the trip actuator latch 37 in the clockwise direction to release the trip actuator latch 37 from the latch pin 43.

Figure 4:
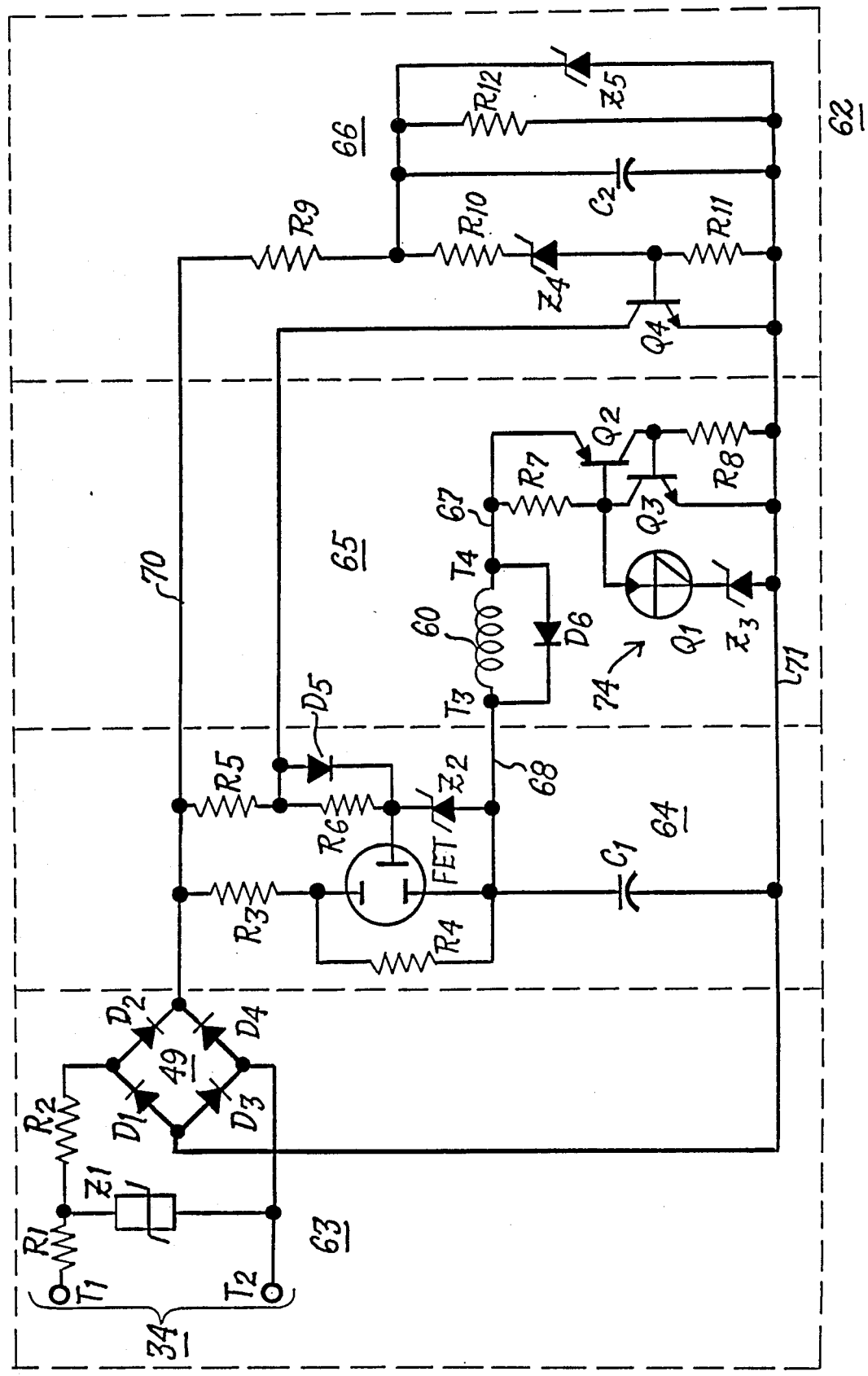
FIG. 4 is a circuit diagram of the shunt trip electrical circuit contained within the printed wire board for the overcurrent and shunt trip actuator-accessory module of FIG. 2.

The shunt trip function is provided by means of the shunt trip circuit 62 seen by now referring to FIG. 4. It is noted that an auxiliary switch, such as described within the referenced actuator-accessory Patents is no longer required to interrupt the external voltage signal applied to the shunt trip coil 60. The shunt trip circuit itself controls the external signal to the shunt trip coil in a manner to be described below in some detail. In operation, the remote shunt trip signal voltage is applied to wire conductors 34 and terminals T1, T2 connected to the input circuit 63. Transient voltage protection is provided to the circuit by the combination of the series resistor $R_1$ and zener diode $Z_1$ which are connected across the input terminals. Resistor $R_2$ is a current limiting resistor connected in series with one of the inputs to the diode bridge rectifier 49 consisting of diodes $D_1$–$D_4$. The output of the bridge rectifier connects respectively with the positive and negative rails, 70, 71. A charging circuit 64 consisting essentially of a storage capacitor $C_1$ connects across the positive and negative rails through an FET and resistor $R_3$. The function of the charging circuit is to provide first and second charging rates to the storage capacitor $C_1$. The first charging rate charges the capacitor in less than 10 milliseconds and is provided by the charging circuit consisting of the FET, resistors $R_3$, $R_5$, $R_6$, a signal diode $D_5$ and a zener diode $Z_2$. When a remote signal voltage is applied over conductors 34 to terminals T1, T2 the gate of the FET becomes positive thereby charging $C_1$, which becomes completely charged in a period of time less than 10 milliseconds. The voltage across $C_1$ is applied across resistor $R_7$, silicon switch $Q_1$ and zener diode $Z_3$ in the switching circuit 65. When the silicon trigger voltage is exceeded, the switch becomes conductive thereby discharging capacitor $C_1$ through the shunt trip coil 60 which is connected with the shunt trip circuit 62 by means of conductors 67, 68 and terminals T3, T4 described earlier. The shunt trip coil immediately responds by providing an electromagnetic field in opposition to the permanent magnet 59 within the actuator-accessory module 31 of FIG. 2 and allows the plunger 36 to interact with the trip actuator latch 37 and thereby articulate the circuit breaker operating mechanism 53 shown in FIG. 3 and described earlier. The fly-back diode $D_6$ is connected across the shunt trip coil to prevent the occurrence of a transient voltage when the circuit turns off. Once the circuit breaker operating mechanism has responded, and a continuous voltage is applied to terminals TI, T2, some means is usually required to insure that the circuit breaker operating mechanism cannot be reset until the remote switch is deactivated. In the prior art arrangement, described earlier, an auxiliary switch interacted with the circuit breaker operating mechanism to interrupt the current applied to the shunt trip coil and to prevent the coil from becoming overheated. The auxiliary switch mechanically interacted with the circuit breaker operating mechanism to insure that the circuit breaker operating mechanism could not be reset without first resetting the auxiliary switch. Since the actuator-accessory module of the instant invention does not include nor require an auxiliary switch, the circuits, per se, insure that the circuit breaker operating mechanism cannot be reset manually while a voltage signal remains impressed across the terminals T1, T2. This is provided by the second capacitor charging circuit through resistor $R_4$ which by-passes the FET in its "OFF" states. The charging current applied to the storage capacitor fully charges the storage capacitor within one to two seconds. The silicon switch responds in the manner described earlier to continuously provide a current pulse to the shunt trip coil 60 every second or so to insure that the circuit breaker operating mechanism remains in a "TRIPPED" condition while the terminals TI, T2 remain energized. The switching function is provided by means of an electronic switch 74 consisting of the silicon switch $Q_1$, zener $Z_3$, resistors $R_7$, $R_8$ and transistor switches $Q_2$, $Q_3$. The electronic switch operates in the manner described in the aforementioned U.S. patent application Ser. No. 176,589. The repeated ON and OFF operation of the electronic switch insures that the required trip current is applied to the shunt trip coil 60 without causing the coil to become overheated. Once the electronic switch is turned off, the storage capacitor begins to recharge. With the silicon switch $Q_1$ conductive, current flows through resistor $R_7$ and the emitter-base junction of the transistor switch $Q_2$ causing $Q_2$ to become conductive. Current then flows through resistor $R_8$ and the emitter-base junction of transistor switch $Q_3$ causing $Q_3$ to become conductive. With $Q_3$ conductive, current is shunted away from the silicon switch $Q_1$ turning off the silicon switch and drawing more current through transistor switch $Q_2$ which thereby provides a regenerative latching action that insures that the electronic switch remains on until the discharge current from the storage capacitor decreases to a predetermined value set by the resistor $R_8$. When the trip current through the shunt trip coil drops below the predetermined value, the electronic switch becomes non-conductive and thereby allows the storage capacitor to charge to a voltage sufficient to exceed the trigger voltage to the silicon switch $Q_1$ causing the ON-OFF cycle to repeat itself. The timing circuit 66 for controlling the "ON"- "OFF" states of the FET connects with the positive rail 70 through resistor $R_9$ and operates in the following manner. When the terminals T1, T2 are energized, the timing capacitor $C_2$ charges to a value determined by resistor $R_{12}$ and the clamping voltage of the zener diode $Z_5$. Resistor $R_{11}$, connected across the base-emitter junction of transistor switch $Q_4$, insures that $Q_4$ remains non-conductive. When the timing capacitor $C_2$ exceeds the clamping voltage of $Z_4$ current flows through resistor $R_{10}$, zener diode $Z_4$ and resistor $R_{11}$ to turn on $Q_4$. With $Q_4$ conductive, the gate terminal of the FET is clamped to the negative rail 71 through resistor $R_6$ turning off the FET. This, in turn, initiates the second charging circuit through resistor $R_4$ as described earlier.

It has thus been shown that an actuator-accessory module containing a flux shift coil for direct operations by means of the circuit breaker trip unit for overcurrent protection and a shunt trip coil connected with a self-contained shunt trip circuit for shunt trip operations via a remote voltage source switch can be provided within a single actuator-accessory module. The shunt trip circuit is capable of providing continuous trip current to the shunt trip coil, without overheating to insure that the circuit breaker operating mechanism remains tripped as long as an external signal voltage is applied to the shunt trip circuit within the actuator accessory module.

Having thus described my invention, what I claim as new and desire to secure by Letters Patent is:

1. A circuit interrupter comprising:
   a pair of separable contacts;
   an operating mechanism arranged for separating said contacts upon command;
   an electromagnetic coil associated with a plunger and a permanent magnet, said plunger restrained from interacting with said operating mechanism against the bias of a charged spring by contacting said permanent magnet and said electromagnetic coil arranged for counteracting with said permanent magnet to allow said plunger to interact with said operating mechanism when a current signal is applied to said electromagnetic coil; and
   a shunt trip circuit connected with said electromagnetic coil for controlling said current signal to said coil, said shunt trip circuit including a storage capacitor connected with said electromagnetic coil said storage capacitor being charged through a first and second charging circuit for supplying said current signal through an electronic switch.

2. The circuit interrupter of claim 1 wherein said first charging circuit includes a FET.

3. The circuit interrupter of claim 2 wherein said FET connects between one side of an external voltage source and one side of said electromagnetic coil.

4. The circuit interrupter of claim 2 wherein said second charging circuit includes a linear resistor.

5. The circuit interrupter of claim 4 wherein said linear resistor connects with a source terminal and a drain terminal on said FET.

6. The circuit interrupter of claim 3 including an electronic switch connecting with another side of said electronic coil.

7. The circuit interrupter of claim 6 wherein a silicon switch within said electronic switch connects with said storage capacitor through a zener diode.

8. The circuit interrupter of claim 7 wherein said electronic switch includes a pair of first and second transistor switches wherein a collector on said first transistor switch connects with a base on said second transistor switch.

9. The circuit interrupter of claim 8 including a timing capacitor connected with a gate and a drain terminal on said FET through corresponding current limiting resistors and connected in common with said storage capacitor.

10. The circuit interrupter of claim 9 including a third transistor switch having an emitter connected with said storage capacitor a collector connected with said gate terminal of said FET through a signal diode.

11. The circuit interrupter of claim 10 wherein said first charging circuit charges at a faster rate than said second charging circuit.

12. The circuit interrupter of claim 11 including a second zener diode connected across said timing capacitor through a second current limiting resistor to control the operation of said third transistor switch.

* * * * *